United States Patent [19]

Chapman

[11] 4,066,371

[45] Jan. 3, 1978

[54] BAR JOINTING MEMBERS

[76] Inventor: Arthur J. Chapman, May Lodge, Cane End, near Reading, England

[21] Appl. No.: 718,533

[22] Filed: Aug. 30, 1976

[51] Int. Cl.² .............................................. F16B 7/04
[52] U.S. Cl. .................................... 403/218; 403/391; 248/431
[58] Field of Search .............. 403/218, 217, 400, 390, 403/391; 248/431, 164

[56] References Cited

U.S. PATENT DOCUMENTS

| 568,802 | 10/1896 | Seaman | 403/390 |
| 2,651,026 | 9/1953 | Roth | 403/391 X |
| 3,512,813 | 5/1970 | Brimberg | 403/218 |

FOREIGN PATENT DOCUMENTS

| 690,743 | 1965 | Italy | 403/391 |
| 486,900 | 11/1953 | Italy | 403/400 |
| 189,039 | 4/1964 | Sweden | 403/217 |
| 677,347 | 8/1952 | United Kingdom | 403/391 |

Primary Examiner—Andrew V. Kundrat

[57] ABSTRACT

A bar jointing member to secure together two or three bars comprising a one piece housing with a plurality of bores extending therethrough and an aperture in the housing receiving a single tapered clamping bolt, said aperture communicating with each of said bores such that portions of said tapered clamping bolt engage respective ones of said bars to clamp them securely in the bores. The tapered clamping bolt may have said portions formed as flat or knife edges to ensure a good clamping action. The wall of one of said bores may have a further screw threaded aperture therein to receive a screw to secure the jointing member on a bar engaged in that bore to facilitate assembly.

3 Claims, 10 Drawing Figures

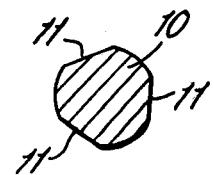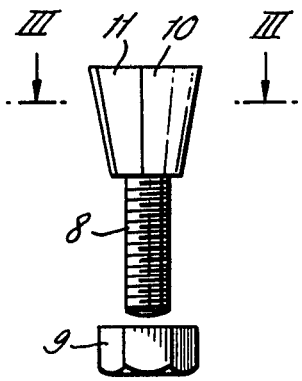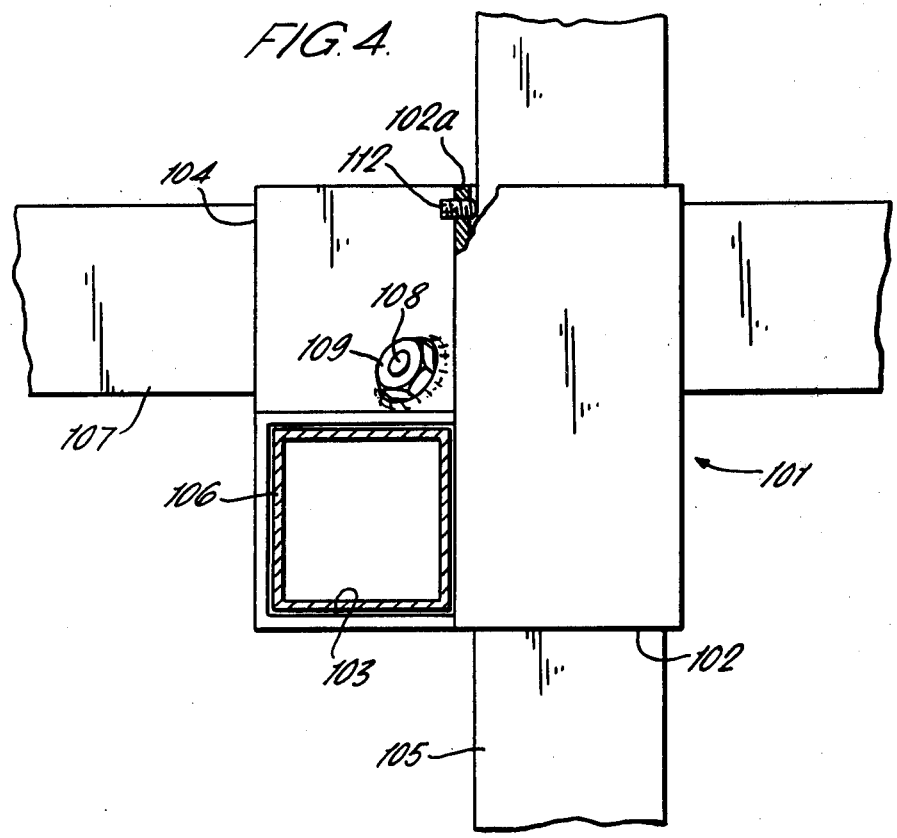

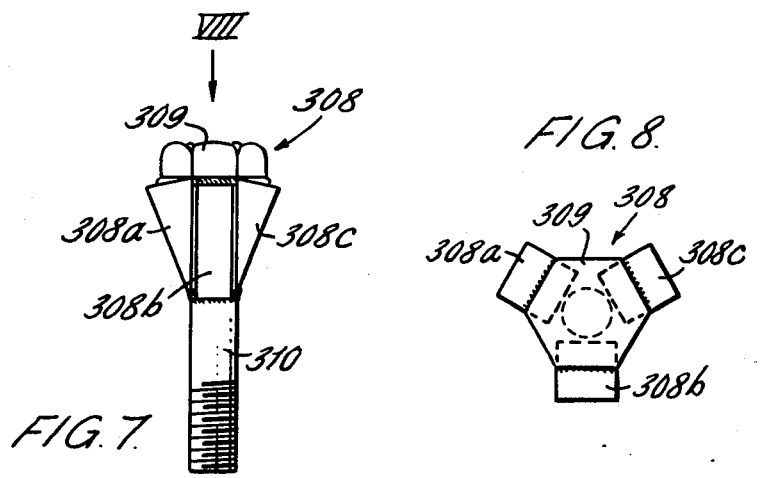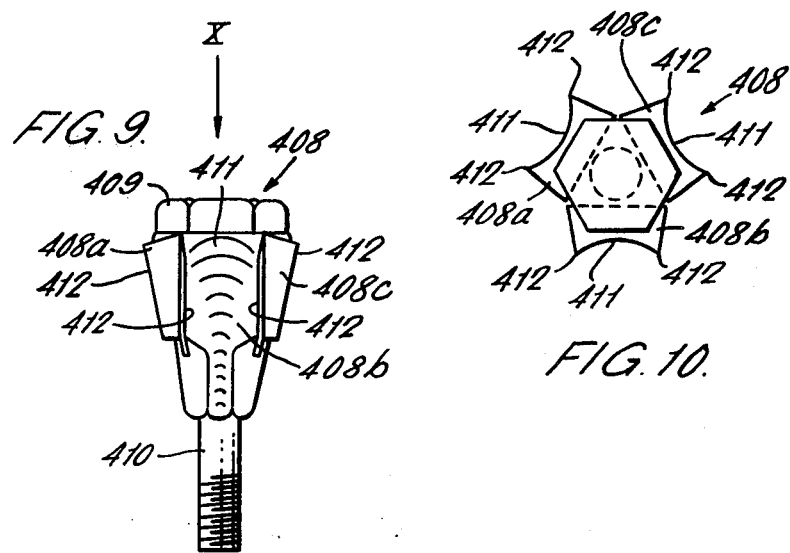

BAR JOINTING MEMBERS

The invention relates to a two or three way bar jointing member.

Bar jointing members are required for joining two or three bars where they meet or cross, usually mutually at right angles, to form scaffolding, particularly mobile scaffolding mounted on wheels, racking, benches and shelving units.

Previously proposed bar jointing member have required a considerable number of small screws or bolts to secure bars in each of the bores of jointing member with one piece housings, such screws or bolts normally engaging in screw-threaded holes in the walls of the bores of the housings, or have had housings provided in two pieces with a bolt coupling the two pieces. Such two piece housings are however expensive to manufacture since arms thereof extend around the bars must be of very strong construction to avoid the risk of them breaking.

The invention has among its objects to provide a bar jointing member which can clamp together a plurality of bars, which can be cheaply produced and which has only a small number of separate components.

According to the invention there is provided a two or three way bar jointing member comprising a one piece housing having a plurality of bores extending therethrough and an aperture extending therethrough to receive a single tapered clamping bolt, the aperture communicating with each of the bores such that portions of the tapered clamping bolt received in the aperture extend into the bores and clamp bars passing through the bores securedly within the bores.

Preferably the bores extend mutally at right angles. The bores may be of circular, rectangular or other section and the housing may be formed by casting or by fabrication.

Preferably a screw-threaded further aperture is provided in the wall of one of the bores, which one of the bores will receive a vertical bar in use, such that a screw engaged in further aperture can be tightened onto the vertical bar to retain the housing at a desired height thereon while bars are engaged in the other of the bores of each of the other bores.

The tapering clamping bolt may have a clamping portion of frusto-conical shape, that is to say of circular section or may be provided with two or more flats on the tapering clamping portion according to the number of bars to be joined. Preferably it is provided on hardened or case hardened steel.

The tapered clamping bolt may have a shank of circular section with a plurality of wedge shaped members secured to the shank. The wedge shaped members may present a flat face or a knife edge to the respective bar.

If desired, and to obtain a more positive clamping effect, the tapered clamping bolt may have a tapering clamping portion presenting two respective longitudinally extending knife edges to each bar extending through the member, such knife edges in operation cutting into the material of the bars.

The invention is diagrammatically illustrated by way of example in the accompanying drawings, in which:-

FIG. 2 is an elevation of a clamping bolt for a jointing member according to the invention;

FIG. 3 is a sectional view taken on line III—III of FIG. 2;

FIG. 4 is a perspective view of another embodiment of the three way bar jointing member according to the invention;

FIG. 7 is an elevation of another embodiment of a clamping bolt for a jointing member according to the invention;

FIG. 8 is a view taken in the direction of arrow VIII of FIG. 7;

FIG. 9 is an elevation of a further embodiment of a clamping bolt for a three way bar jointing member according to the invention; and FIG. 10 is a view taken in the direction of arrow X of FIG. 9.

Figure 1:
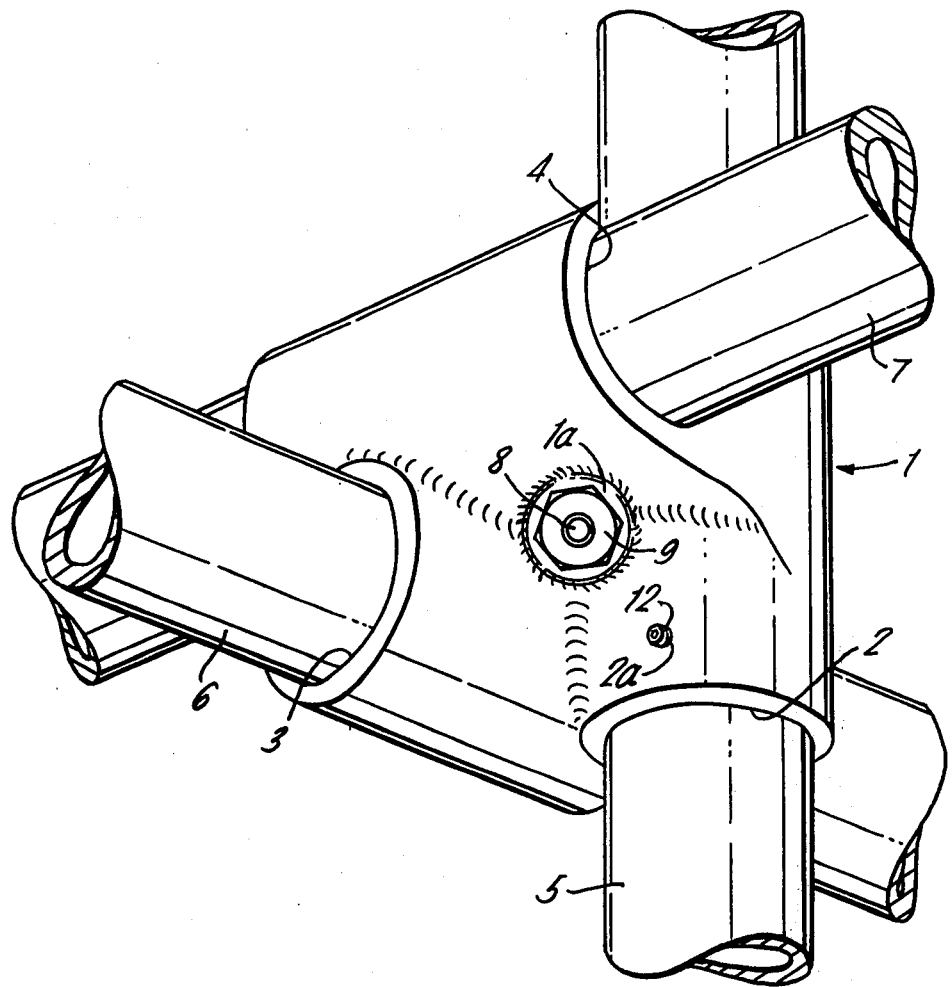
FIG. 1 is a perspective view of a three way bar jointing member according to the invention.

Referring to the drawings and firstly to FIG. 1, a three way bar jointing member comprises a one piece housing 1 formed as a casting and having a vertical bore 2 and two horizontal bores 3 and 4, extending therethrough mutually at right angles, the bores 2, 3 and 4, receiving tubular bars 5, 6 and 7 respectively. A clamping bolt 8 extends through the middle of the housing 1 and can be tightened by a nut 9 which bears against a seat 1a. As shown in FIGS. 2 and 3, the clamping bolt 8 has a head 10 of tapering form with three flats 11 at angles of 60° to one another. The head portion 10 of the clamping bolt 8 is received in an aperture in the member 1, which aperture extends into each of the bores 2, 3 and 4 such that when the head portion 10 of the clamping bolt 8 is pulled into the aperture, by tightening the nut 9 against the seat 1a, the flats 11 of the head portion 10 engage against the surfaces of the tubular bars 5, 6 and 7 in the bores 2, 3 and 4 respectively to clamp them against movement therein.

The wall of the bore 2 includes a screw-threaded further aperture 2a in which a grub screw 12 is engaged whereby the housing 1 can be locked against movement on the tubular bar 5 during erection. Thus when building a framework the tubular bar 5 is first engaged in the bore 2, the tubular bar 5 is placed in a vertical orientation, the housing 1 is adjusted on the tubular bar 5 to the desired height and the grub screw 12 is tightened. The grub screw 12 may have a cup shaped or pointed inner end to bite into the bar 5. A boss may be included in the casting around the further aperture 2a to give more screw threads to engage with the grub screw 12. The tubular bars 6 and 7 can then be inserted into the bores 3 and 4 respectively of the housing 1 and when in the desired position the clamping bolt 8 can be inserted and the nut 9 tightened to clamp all three of the tubular bars 5, 6 and 7 securely in the bores 2, 3 and 4 respectively. The flats 11 on the head portion 10 of the clamping bolt 8 are not essential and the head portion 10 can be of frusto-conical shape with a tapering circular section if preferred.

Referring to FIG. 4, a three way bar jointing member comprises a housing 101 formed by fabrication has three square section bores 102, 103 and 104 which receive square section tubular bars 105, 106 and 107 respectively. A clamping bolt 108 can be tightened by a nut 109 to clamp the tubular bars 105, 106 and 107 securely in the bores 102, 103 and 104 respectively and a grub screw 112 engaged in a screw threaded further aperture 102a, can secure the housing 101 against vertical movement on the tubular bar 105 during erection. This allows erection by one person i.e. without an assitant.

Figure 5:
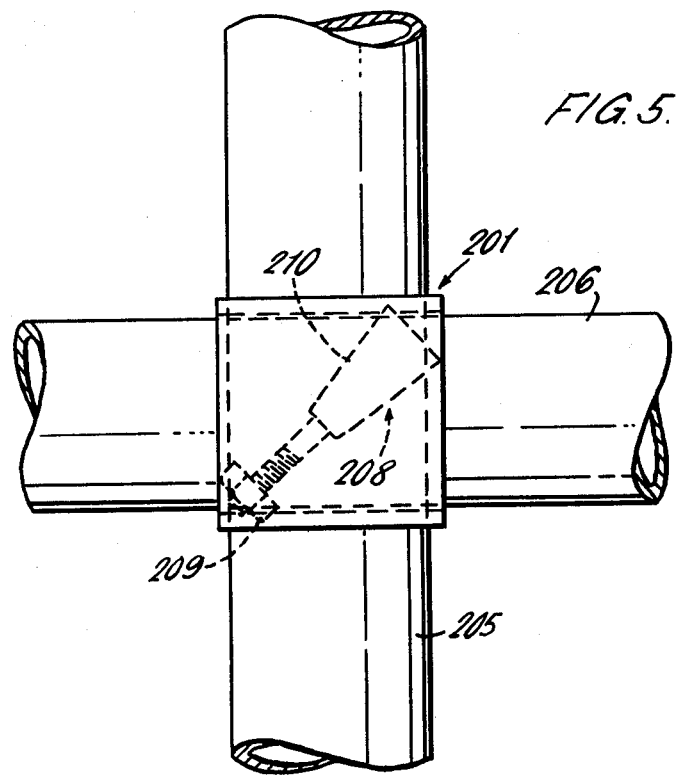
FIG. 5 is a side view of a two way bar jointing member according to the invention.
Figure 6:
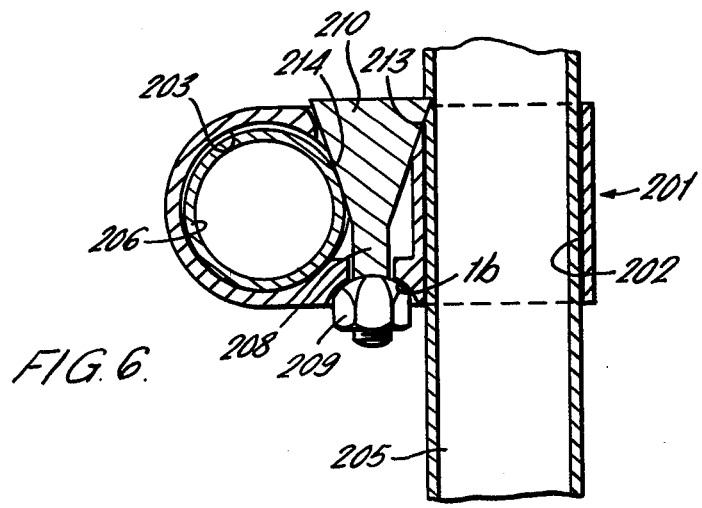
FIG. 6 is a sectional view through the jointing member of FIG. 5.

A two way bar jointing member shown in FIGS. 5 and 6 comprises a housing 201 formed as a casting with two bores 202, 203 which receive tubular bars 205 and 206 of circular section. A tapered clamping portion 210 of a clamping bolt 208 extends through the housing 201 at an angle of 45° to each of the bore 202, 203 and engages at positions 213 and 214 against the tubular bars 205 and 206 respectively when a clamping nut 209 is tightened on the clamping bolt 208. Although not shown in FIGS. 5 and 6, a grub screw may be provided to clamp the jointing member 201 on the vertical bar 205 during erection.

The housings 1, 101 and 201 can be used with tubular bars of desired section and length to form racking, handrailing, scaffolding and the like. In such uses the bores of the housings will normally be provided mutually at right angles. For use, for example, for forming a hammock frame, however, jointing member may require having housings with bores extending in directions other than mutually at right angles. The jointing members of the invention have the advantage that where a lesser number of tubular bars is provided than there are bores in the housing, no dummy bar is required to fill the spare bore. Preferably the clamping bolts 8 are formed by drop-forging.

The housings may be provided with a flat seating 1a for the clamping nut 9, 109 or, as shown in FIG. 6, the clamping nut 209 may have a domed inner face to co-operate with a domed seating 1b.

A clamping bolt 308, shown in FIGS. 7 and 8, has three wedge shaped portions 308a, 308b and 308c welded to a head 309 of a shank 310 of the bolt, the bolt 308 co-operating with bars extending through a three-way housing in similar manner to the bolt 8 of FIGS. 2 and 3.

A clamping bolt 408 shown in FIGS. 9 and 10 has three generally wedge shaped portions 408a, 408b and 408c welded to a head 409 and a shank 410 in similar manner to the bolt of FIGS. 7 and 8, but the outer faces of the portions 408a, 408b and 408c each have a groove 411 therein to present two knife edges 412 on each portion, the two knife edges 412 of each portion being generally parallel to each other but tapering inwardly towards the longitudinal axis of the shank 410 of the bolt 408. The knife edges cut into the metal of the bars passing through the bores of the housing to obtain a strong positive clamping force. An aperture in the housing to receive the clamping bolt 308 or 408 may have flutes to co-operate with the portions 308a to c or 408a to c to give a fixed alignment i.e. rotational position of the clamping bolt 308 or 408. If desired the clamping bolts 308 and 408 may be formed from a single piece of steel by cold forming rather than by assembly of several components and welding together.

What is claimed is:

1. A bar jointing member comprising a one piece housing formed to present a plurality of bores and an aperture each extending through said housing; a plurality of bars engaged in and passing through respective ones of said bores; and a tapered clamping bolt received in said aperture; said aperture communicating with each of said bore such that portions of said tapered clamping bolt engaged in said aperture extend into said bores and engage said bars to clamp said bars securely within said bores, the wall of one of said bores being formed to present a screwthreaded further aperture, which one of said borres will receive a vertical one of said bars in use, and a screw engaged in said further aperture to be tightened onto said vertical one of said bars to retain the housing at a desired height thereon while others of said bars are engaged in the others of said bores.

2. A bar jointing member comprising a one piece housing formed to present a plurality of bores and an aperture each extending through said housing; a plurality of bars engaged in and passing through respective ones of said bores; and a tapered clamping bolt received in said aperture; said aperture communicating with each of said bores such that portions of said tapered clamping bolt engaged in said aperture extend into said bores and engage said bars to clamp said bars securely within said bores, wherein said tapered clamping bolt has a shank of circular section and a plurality of wedge shaped clamping members secured to said shank and forming said portions which extend into said bores and engage said bars, and wherein each of said wedge shaped clamping members presents a knife edge to each respective bar to cut into said respective bar to obtain a positive locking action.

3. A bar jointing member comprising a one piece housing formed to present a plurality of bores and an aperture each extending through said housing; a plurality of bars engaged in and passing through respective ones of said bores; and a tapered clamping bolt received in said aperture; said aperture communicating with each of said bore such that portions of said tapered clamping bolt engaged in said aperture extend into said bores and engage said bars to clamp said bars securely within said bores, wherein said tapered clamping bolt has a tapering clamping portion presenting two respective longitudinally extending knife edges to each respective bar, said knife edges forming said portions which extend into said bores and engage said bars, said knife edges cutting into the material of said bars to obtain a positive locking action.

* * * * *